March 28, 1961 TOSHIAKI BANNO 2,976,765
SYSTEM FOR SYNCHRONOUSLY OPERATING CINEFILM PROJECTOR AND MAGNETIC TAPE RECORDER
Filed March 11, 1958
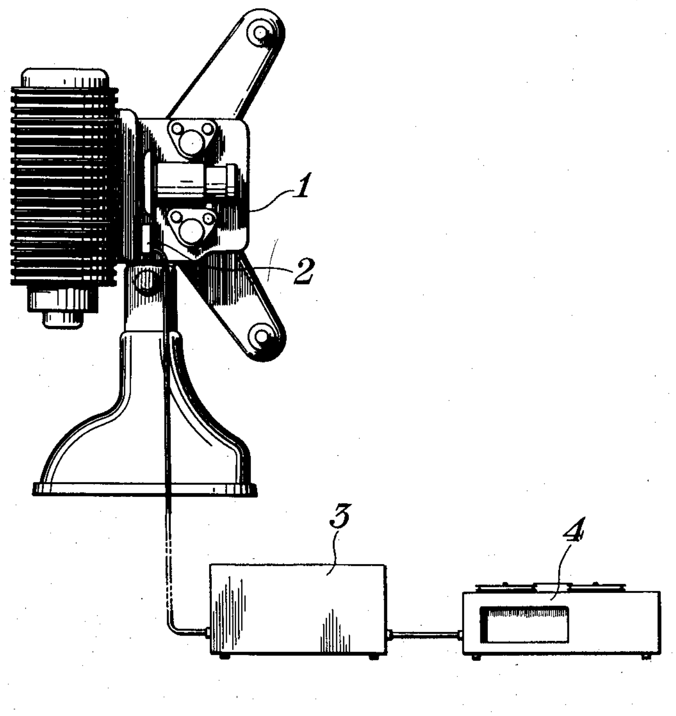

United States Patent Office 2,976,765

Patented Mar. 28, 1961

2,976,765

SYSTEM FOR SYNCHRONOUSLY OPERATING CINEFILM PROJECTOR AND MAGNETIC TAPE RECORDER

Toshiaki Banno, Suwa, Japan, assignor to Kabushiki-Kaisha Sankyo Seiki Seisakusho, Suwa, Japan, a corporation of Japan Filed Mar. 11, 1958, Ser. No. 720,651

Claims priority, application Japan June 29, 1957

1 Claim. (Cl. 88—16.2)

This invention relates to a system for synchronously operating or synchronizing a cinefilm projector, particularly a miniature cinefilm projector, and a magnetic tape recorder.

The object of the invention is to provide a new system for synchronously operating or synchronizing a cinefilm projector and a magnetic tape recorder to enable the utilization of a silent film for talkie projection.

In a conventional type of a miniature cinefilm projector a driving means usually consists of a commutator motor and, on the other hand, a magnetic tape recorder is usually driven by an induction or synchronous motor. Hence, it is generally impossible to synchronously operate or synchronize such a projector in conjunction with a magnetic recorder. To overcome this difficulty, according to the present invention, a flashing light produced by intermittently interrupting the light beam from a light source for projection by means of a shutter in the cinefilm projector is caused to fall on an appropriate element having photoelectric effect so that a pulsating current is obtained photoelectrically from said photoelectric element, and the pulsating current produced thereby is amplified and employed for actuating the motor for feeding the tape in the tape recorder.

The invention will now be described with reference to the accompanying drawing, in which the system according to this invention is diagrammatically illustrated.

Referring to the drawing, 1 designates a miniature cinefilm projector, and 2 is an element such as a photocell or a phototransistor having photoelectric effect and disposed in such position adapted to receive a light beam from the light source in the projector housing, said light beam being emitted through a slit or hole provided in the projector housing. Said light beam emitting through the slit is disposed in such position that it is intermittently interrupted by means of a rotating shutter provided in the projector 1 before reaching the element 2. Accordingly, a pulsating current, or pseudo-alternating current, is obtained photoelectrically from the photoelectrical element 2. This pulsating current is sufficiently amplified by a low frequency amplifier 3 to such an extent that it actuates a motor, the amplified current being utilized to drive directly a motor for the tape recorder 4, or a motor mounted separately, for feeding the tape in the tape recorder. The speed of the motor for tape feeding, which is usually an induction or synchronous motor as described above, is determined by the frequency of the electric current. According to this invention, since the system is arranged to drive the tape-feeding motor by pseudo-alternating current having a frequency corresponding to the number of revolution of the shutter shaft of the projector, the projector and the tape recorder in this system operate in exact synchronism, so that it is possible to effect the talkie projection by utilizing any silent film.

In the case of a miniature cinefilm, if magnetic recording were made on the sound track of the film, there would be a deficiency that the sound quality is deteriorated because of the low feeding speed for such miniature cinefilm. For this reason, various systems for synchronous operation of a cinefim projector and a magnetic tape recorder have been proposed. However, in attempting to attain synchronous operation by the use of a stroboscope, visual control of such operation has not been successfully effected. Further, mechanical association for synchronous operation of the rotating parts of both the cinefilm projector and the magnetic tape recorder not only involves structural difficulties but it does not allow the projector and the tape recorder to be located apart from each other.

In contrast with the above mentioned existing systems, according to this invention the synchronous operation or synchronization of the two devices can be effected with accuracy, as the synchronous association of the two rotating parts is effected electrically. Furthermore, since the cinefilm projector and the tape recorder can be located at any desired distance apart from each other, the tape recorder having a reproducing head built therein can be carried to any desired point according to the nature of the place where the projection is carried out, so that the sound effect can be conveniently improved.

What I claim is:

In a system for synchronously operating a motion picture projector and a tape recorder and playback apparatus and the like, the motion picture projector having a source of radiant energy, a traveling film, and a shutter operable in timed relationship with the traveling film to control intermittent irradiation of said traveling film to project successive individual frames on said film successively, the recorder having a frequency-responsive driving motor operable at a speed corresponding to the frequency of the input thereto, the improvement which comprises a radiation-responsive element mounted on said projector cooperative with said shutter for generating photo-current, said element being disposed on said projector for receiving intermittent radiations from said source under control of said shutter at a frequency representative of the speed of travel of said film and for periods corresponding to periods of irradiation of the individual film frames and electrical connections between the radiation-responsive element and said motor including amplifying means to apply photo-current generated in said element as an amplified input to the motor.

References Cited in the file of this patent

UNITED STATES PATENTS

| | | |
|---|---|---|
| 2,604,321 | Williams | July 22, 1952 |
| 2,637,785 | Charlin | May 5, 1953 |
| 2,760,137 | Andrews | Aug. 21, 1956 |